US005673557A

United States Patent [19]

Yoshida et al.

[11] Patent Number: 5,673,557

[45] Date of Patent: Oct. 7, 1997

[54] DISPLACEMENT CONTROL SYSTEM FOR VARIABLE DISPLACEMENT TYPE HYDRAULIC PUMP

[75] Inventors: Nobumi Yoshida; Tadao Karakama; Nobuhisa Honda, all of Kanagawa, Japan

[73] Assignee: Komatsu Ltd., Tokyo, Japan

[21] Appl. No.: 571,974

[22] PCT Filed: Aug. 11, 1994

[86] PCT No.: PCT/JP94/01334

§ 371 Date: Jan. 16, 1996

§ 102(e) Date: Jan. 16, 1996

[87] PCT Pub. No.: WO95/05544

PCT Pub. Date: Feb. 23, 1995

[30] Foreign Application Priority Data

Aug. 12, 1993 [JP] Japan .................................... 5-200634

[51] Int. Cl.$^6$ .................................................... F16D 31/02

[52] U.S. Cl. ................................ 60/421; 60/422; 60/430; 60/452; 137/884

[58] Field of Search .............................. 60/421, 422, 428, 60/430, 452, 471, 484; 137/596.13, 884

[56] References Cited

U.S. PATENT DOCUMENTS

| | | | |
|---|---|---|---|
| 4,561,341 | 12/1985 | Aikawa | 91/6 |
| 5,115,835 | 5/1992 | Ueno | 137/596.13 |
| 5,148,676 | 9/1992 | Moriya et al. | 91/28 X |
| 5,243,820 | 9/1993 | Shimoura et al. | 60/452 |
| 5,454,223 | 10/1995 | Tschida et al. | 60/452 X |

FOREIGN PATENT DOCUMENTS

| | | | |
|---|---|---|---|
| 57-116909 | 7/1982 | Japan . | |
| 57-157083 | 9/1982 | Japan . | |
| 4-258506 | 9/1992 | Japan | 60/452 |

*Primary Examiner*—Hoang Nguyen

*Attorney, Agent, or Firm*—Nikaido, Marmelstein, Murray & Oram LLP

[57] ABSTRACT

In a displacement control system for a variable displacement type hydraulic pump for supplying a discharge pressurized fluid of the variable displacement type hydraulic pump to an actuator via a direction control valve and then controlling a displacement of said variable displacement type hydraulic pump for maintaining a pressure difference between a discharge pressure of said variable displacement type hydraulic pump 1 and a load pressure at a portion between a direction control valve and an actuator, wherein an inlet side pressure of said direction control valve is detected as said discharge pressure.

9 Claims, 6 Drawing Sheets

DISPLACEMENT CONTROL SYSTEM FOR VARIABLE DISPLACEMENT TYPE HYDRAULIC PUMP

FIELD OF THE INVENTION

The present invention relates to a displacement control system for a variable displacement type hydraulic pump.

BACKGROUND ART

As a displacement control system for a variable displacement type hydraulic pump, a system performing control with a pump discharge pressure and a load pressure, as shown in FIG. 1, for example, has been known.

Namely, a direction control valve 3 is provided in a discharge path 2 of a variable displacement type hydraulic pump 1 (hereinafter referred to as variable hydraulic pump) and then a pressurized fluid is supplied to an actuator 4 via the direction control valve 3. A displacement control cylinder 6 is provided for driving a displacement control member 5, such as a swash plate and so forth of the variable hydraulic pump 1. One chamber 6a of the displacement control cylinder 6 is connected to a discharge path 2 via a first circuit 7. The other chamber 6b is selectively connected to a second circuit 9 (connected to the discharge path 2) via a pump port side of a displacement control valve 8 and to a tank circuit 10 via a drain port side of the displacement control valve. A first pressure receiving portion 11 of the displacement control valve 8 is connected to the second circuit 9, and the second pressure receiving portion 12 is connected to a load pressure detecting circuit 14 which is connected to the actuator 4. The displacement control valve 8 is forced to a communicating position A by a pressurized fluid (pump discharge pressure $P_1$) acting on the first pressure receiving portion 11, and to a drain position B by a pressurized fluid (load pressure $P_{LS}$) acting on the second pressure receiving portion 12 and a spring 13. It should be noted that a circuit for returning the pressurized fluid from the actuator 4 to a tank is neglected for simplification of the drawing.

With the displacement control system, the displacement control valve 8 is placed at the communicating position A when a pressure difference $\Delta P_{LS}$ between the pump discharge pressure $P_1$ and the load pressure $P_{LS}$ becomes higher to actuate the displacement control cylinder 6 in X direction to operate the displacement control member 5 in a direction for smaller displacement, and is placed at the drain position B when a pressure difference $\Delta P_{LS}$ between the pump discharge pressure $P_1$ and the load pressure $P_{LS}$ becomes lower to actuate the displacement control cylinder 6 in Y direction to operate the displacement control member 5 in a direction for greater displacement. In practice, the displacement control member 5 is controlled for establishing equilibrium between the pressure difference $\Delta P_{LS}$ of the pump discharge pressure $P_1$ acting on the first pressure receiving portion and the load pressure $P_{LS}$ acting on the second pressure receiving portion 12 and the load of the spring 13. Namely, the displacement of the variable displacement pump 1 is controlled so that the pressure difference between the pump discharge pressure $P_1$ and the load pressure $P_{LS}$ is maintained constant.

With such displacement control system, when the open area of the direction control valve 3 is reduced while a constant flow rate of pressurized fluid flows (at this time the pressure difference $\Delta P_{LS}$ is maintained constant), the pressure difference $\Delta P_{LS}$ becomes greater. Therefore, the displacement control member 5 is actuated in the direction for smaller displacement until the $\Delta P_{LS}$ returns to the initial value. On the other hand, when the open area of the direction control valve 3 is increased, the pressure difference $\Delta P_{LS}$ becomes smaller. Therefore, the displacement control member 5 is actuated in the direction for greater displacement until the pressure difference $\Delta P_{LS}$ returns the initial value. Accordingly, the displacement of the variable hydraulic pump 1 becomes a value depending upon the open area of the direction control valve. Namely, the displacement is controlled to maintain a pressure loss (the pressure difference $\Delta P_{LS}$ between the pump discharge pressure and the load pressure) upon flowing of the pressurized fluid through the direction control valve 3 constant.

However, in the conventional control system as set forth above, the displacement control cylinder 6 and the displacement control valve 8 are provided within a single pump body 15. In this connection, the first and second circuits 7 and 9 are also provided in the pump body 15. On the first pressure receiving portion 11 of the displacement control valve 8, the pressure of a pump discharge portion 16 acts as the pump discharge pressure $P_1$.

Therefore, the load pressure $P_{LS}$ acting on the second pressure receiving portion 12 of the displacement control valve 8 is lower than the pump discharge pressure $P_1$ acting on the first pressure receiving portion 11 in the extent of a sum of the pressure loss caused when the pressurized fluid flows through the direction control valve 3 and a pressure loss caused when the pressurized fluid flows through the discharge path 2 connecting the hydraulic pump 1 and the inlet of the direction control valve 3. Namely, since the displacement control valve 8 is affected by the pressure loss due to flow resistance in the direction control valve 3 and the pressure loss due to path resistance in the discharge path 2, the displacement of the variable hydraulic pump 1 cannot be controlled to maintain the pressure loss caused when the pressurized fluid flows through the direction control valve 3. Thus, it becomes impossible to accurately supply the flow rate depending upon the open area of the direction control valve 3 to the actuator 4. Particularly, when large flow rate of pressurized fluid is to be flown, the pressure loss in the discharge path of the pump is increased to reduce the supply flow rate to the actuator 4.

It is an object of the present invention to provide a displacement control system for a variable displacement type hydraulic pump, which can control a displacement without being influenced by a pressure loss of a discharge path of the variable displacement type pump and namely, can control the displacement of the variable displacement type hydraulic pump so that the pressure loss at a direction control valve is maintained constant.

DISCLOSURE OF THE INVENTION

In order to accomplish the above-mentioned object, in accordance with the present invention, there is provided a displacement control system for a variable displacement type hydraulic pump for supplying a discharge pressurized fluid of the variable displacement type hydraulic pump to the actuator via the direction control valve and then controlling a displacement of the variable displacement type hydraulic pump for maintaining a pressure difference between a discharge pressure at a portion between the variable displacement type hydraulic pump 1 and a load pressure of a direction control valve and an actuator, wherein an inlet side pressure of the direction control valve is detected as the discharge pressure.

With the construction set forth above, the pressure at the inlet side of the direction control valve is detected as the pump discharge pressure and the displacement of the variable displacement type hydraulic pump is controlled to maintain the pressure difference between the pump discharge pressure and the load pressure constant. Therefore, the displacement can be controlled without being affected by the pressure loss in the discharge path of the variable displacement type hydraulic pump. Namely, the displacement of the variable displacement type pump can be controlled so that the pressure loss in the direction control valve becomes constant.

On the other hand, in the construction set forth above, it is desirable that the displacement control system comprises a displacement control member of the variable displacement type hydraulic pump, a displacement controlling cylinder actuating the displacement control member and a displacement control valve supplying the pressurized fluid to the displacement control cylinder, wherein the displacement control valve being actuated in a direction for smaller displacement in response to the pressure acting on the first pressure receiving portion and in a direction for greater displacement in response to the pressure acting on the second pressure receiving portion, and that a pump discharge pressure detecting circuit connected to the first pressure receiving portion is connected to the inlet side of the direction control valve and a load pressure detecting circuit connected to the second pressure receiving portion is connected to the outlet side of the direction control valve.

Also, an orifice may be provided in the pump discharge pressure detecting circuit for preventing the pressure acting on the first pressure receiving portion of the displacement control valve from varying abruptly to stabilize the displacement control valve.

Furthermore, in the construction set forth above, the direction control valve may include a valve body, a spool bore formed in the valve body and having a pump port and an actuator port, and a spool disposed within the spool bore and establishing and blocking communication between the pump port and the actuator port, valve bodies of a plurality of the direction control valves may be combined with mutually communicating respective pump ports, the discharge path of the variable hydraulic pump may be connected to the pump port of one of the valve bodies of the plurality of direction control valves, and the pump discharge pressure detecting circuit may be connected to the pump port of another valve body of the plurality of direction control valves.

Also, a cover having a fluid conduit communicated with the pump port may be coupled with the another valve body, and the pump discharge pressure detecting circuit is connected to the fluid conduit. A maximum load pressure detecting circuit may be provided in a circuit communicating the actuator port and the actuator for supplying the maximum load pressure detected by the maximum load pressure detecting circuit to the load pressure detecting circuit. An orifice may be provided in the pump discharge pressure detecting circuit.

In the construction set forth above, it is possible that the direction control valve may include a valve body, a spool bore formed in the valve body and having a pump port and an actuator port, and a spool disposed within the spool bore and establishing and blocking communication between the pump port and the actuator port, valve bodies of a plurality of the direction control valves may be combined with mutually communicating respective pump ports to form a block, a confluence valve having a valve body and two input ports formed in the valve body and communicated with each other is provided, two blocks are connected at both sides of the valve body of the confluence valve with communicating respective pump ports of the two blocks and the two inlet ports, thus the discharge paths of respective variable displacement type hydraulic pumps connected to respective of the two blocks are connected to the two inlet ports respectively, and pump discharging pressure detecting circuits of respective displacement control system connected to respective of the two blocks are connected to the pump ports of the two blocks respectively.

With this construction, the discharged pressurized fluid of two variable displacement type hydraulic pumps can be combined and supplied to one actuator.

Furthermore, a cover having the fluid conduits communicated with the pump ports may coupled with the valve body in each block, located at the opposite side of the confluence valve, and each of the pump discharge pressure detecting circuits may be connected to each fluid conduit. Also, the a maximum load pressure detecting circuit may be provided in a circuit communicating the actuator port and the actuator so as to supply the maximum pressure detected by the maximum pressure detecting circuit to each of the load pressure detecting circuits.

In addition to the construction set forth above, it is desirable that an inlet pressure detecting port is formed in the valve body of the direction control valve in one of the block, located remote from the confluence valve, which inlet pressure detecting port communicates with the pump port only when the pump port is communicated with the actuator port, the inlet pressure detecting port is connected to the pump discharge pressure detecting circuit of the displacement control system connected to the other block, and an orifice is provided in the pump discharge pressure detecting circuit.

With the construction set forth above, it can avoid lowering of the displacement of the variable displacement type hydraulic pump due to the pressure loss by flowing the discharged pressurized fluid of the variable displacement pump connected to one block through pump ports of a plurality of direction control valves in the other block or through the communicating portion of the confluence valve. Therefore, the pressurized fluid corresponding to a controlling pressure difference can be supplied to the actuator.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

BEST MODE FOR IMPLEMENTING INVENTION

The preferred embodiments of displacement control systems for variable displacement type hydraulic pump according to the present invention will be discussed hereinafter with reference to the accompanying drawings.

Figure 1:
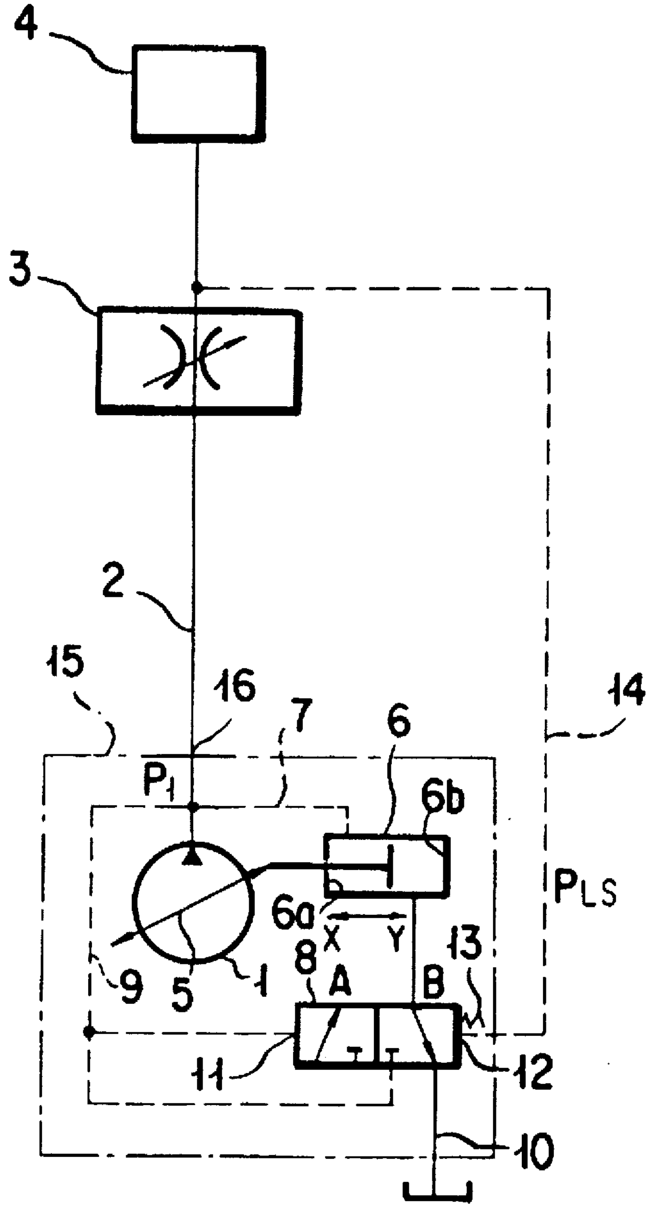
FIG. 1 PRIOR ART
FIG. 1 is hydraulic circuit diagram of the conventional displacement control system for a variable displacement type hydraulic pump.
Figure 2:
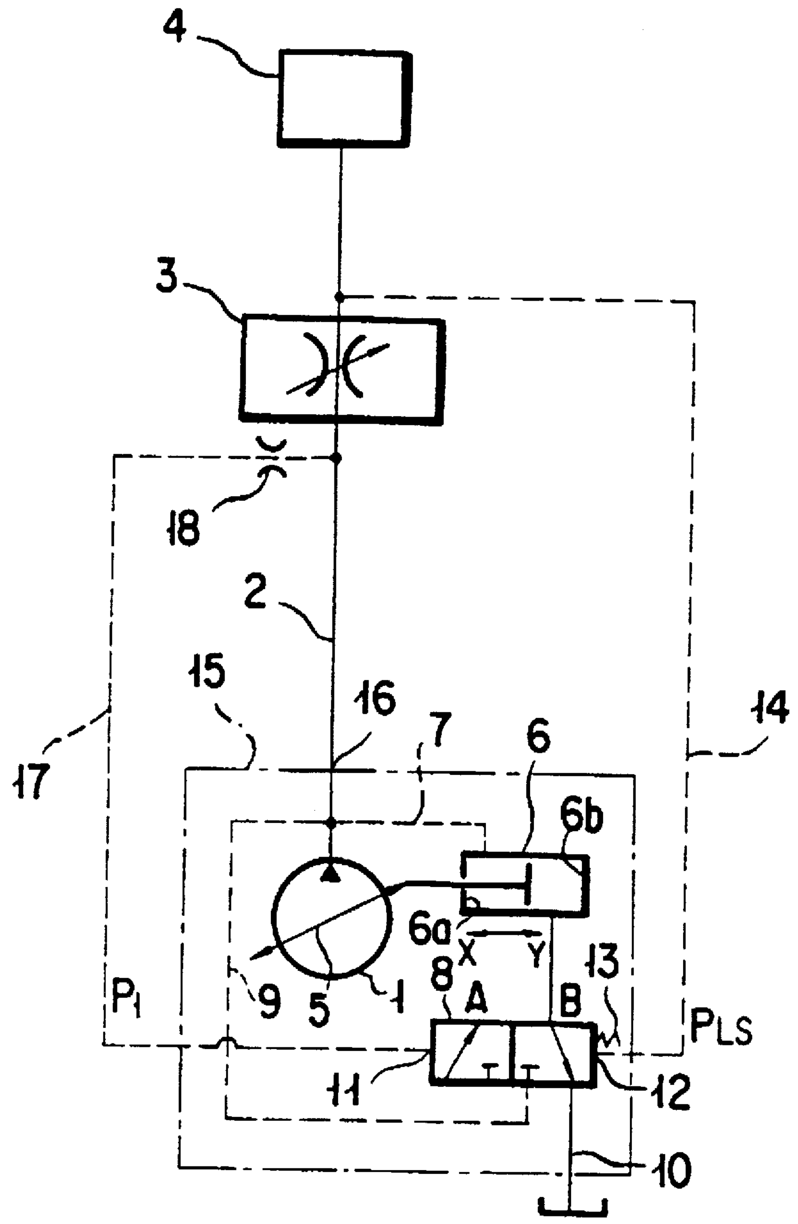
FIG. 2 is a hydraulic circuit diagram showing the first embodiment of a displacement control system for the variable displacement type hydraulic pump according to the present invention.

The first embodiment of the present invention will be discussed with reference to FIG. 2. It should be noted that like components common to the foregoing prior art will be represented by the like reference numerals and the discussion therefor will be neglected. Also, for simplification of the drawing, the circuit for returning the pressurized fluid from the actuator 4 to the tank will be neglected.

In the shown embodiment, a pump discharge pressure detecting circuit 17 is provided. One end of the circuit 17 is connected to the first pressure receiving portion 11 of the displacement control valve 8 and the other end thereof is connected to the inlet side of the direction control valve 3 so that the pressure at the inlet side of the direction control valve 3 acts on the first pressure receiving portion 11 of the displacement control valve 8 as the pump discharge pressure.

Since the shown embodiment is constructed as set forth above, the pump discharge pressure $P_1$ acting on the first pressure receiving portion 11 of the displacement control valve 8 is not affected to the pressure loss of the pump discharge path of the hydraulic pump 1. Accordingly, the pressure difference $\Delta P_{LS}$ between the pump discharge pressure $P_1$ acting on the first pressure receiving portion 11 of the displacement control valve 8 and the load pressure $P_{LS}$ acting on the second pressure receiving portion 12, becomes substantially equal to the pressure loss in the direction control valve 3. As a result, the displacement of the variable hydraulic pump 1 can control so as to maintain the pressure loss upon flowing through the direction control valve 3 constant.

It should be noted that a orifice 18 may be provided in the pump discharge pressure detecting circuit 17 for avoiding abrupt variation of the pressure acting on the first pressure receiving portion 11 of the displacement control valve 8 to stabilize the displacement control valve 8.

Figure 3:
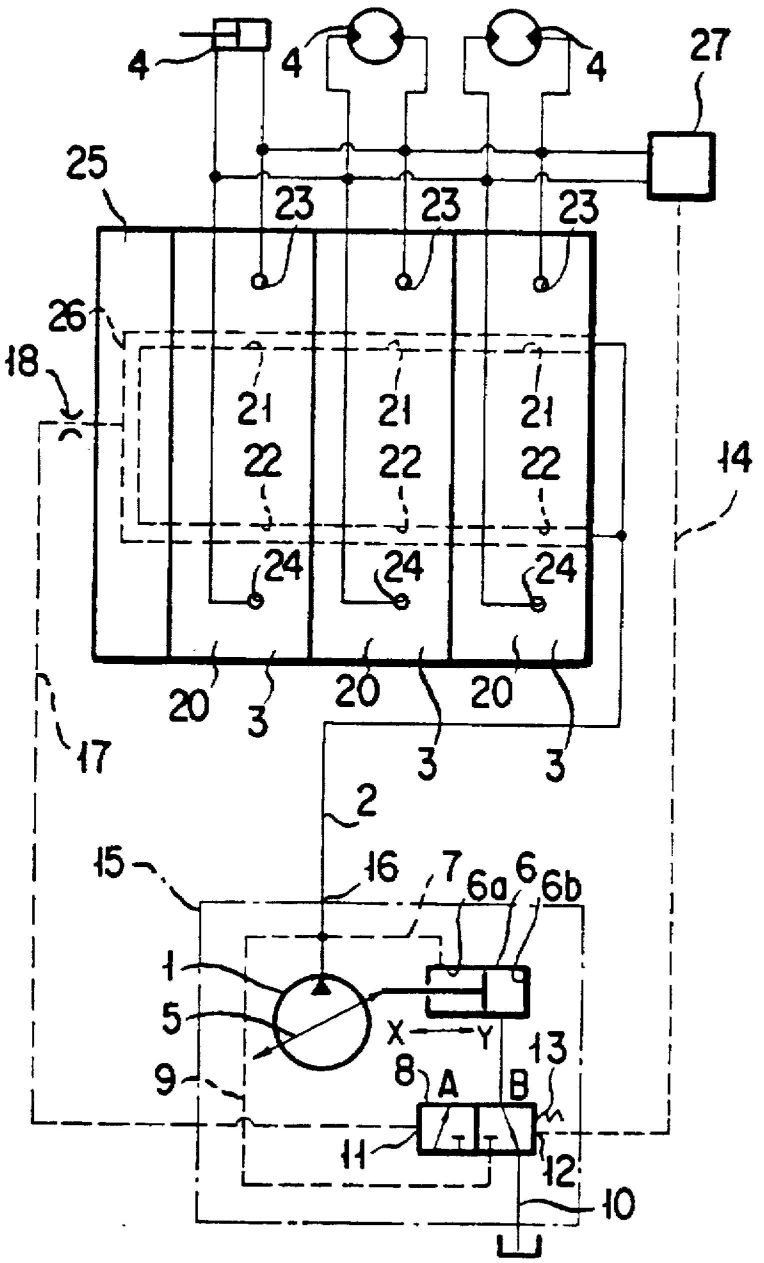
FIG. 3 is a hydraulic circuit diagram showing the second embodiment.

FIG. 3 shows the second embodiment.

In the shown embodiment, the direction control valve 3 is constructed as follows. First and second pump ports 21 and 22, first and second actuator ports 23 and 24, and first and second tank ports (not shown) are formed in the valve body 20. Then, in a not shown spool bore of the valve body 20, a not shown spool is inserted. Thus, the direction control valve is constructed to shut off respective ports 21, 22, 23, 24 and so forth at a neutral position of the spool, and to establishes a communication between the first or second pump ports 22 and the first or second actuator ports 23, 24 and a communication between the second or first actuator port 24, 23 and second or first tank port at a first or second position of the spool.

Then, valve bodies 20 of a plurality of direction control valves 3 are combined in parallel so that respective first pump ports 21 and second pump ports 22 are communicated, and the discharge path 2 of the variable hydraulic pump 1 is connected with first and second pump ports 21 and 22 of one of the direction control valves 3. A cover 25 is connected with the valve body 20 of the other direction control valve 3. The cover 25 is formed with fluid conduits 26 communicating with the first and second pump ports 21 and 22. The pump discharge pressure detecting circuit 17 is connected to the fluid conduits 26.

Furthermore, in a circuit communicating the first and second actuator ports 23 and 24 of respective direction control valves 3 and respective actuators 4, a maximum load pressure detecting circuit 27 is provided. The maximum load pressure detecting circuit 27 is adapted to compare load pressures of respective actuators 4 by a plurality of shuttle valves and whereby detect the highest load pressure. The detected highest load pressure is supplied to the load pressure detecting circuit 14.

Figure 4:
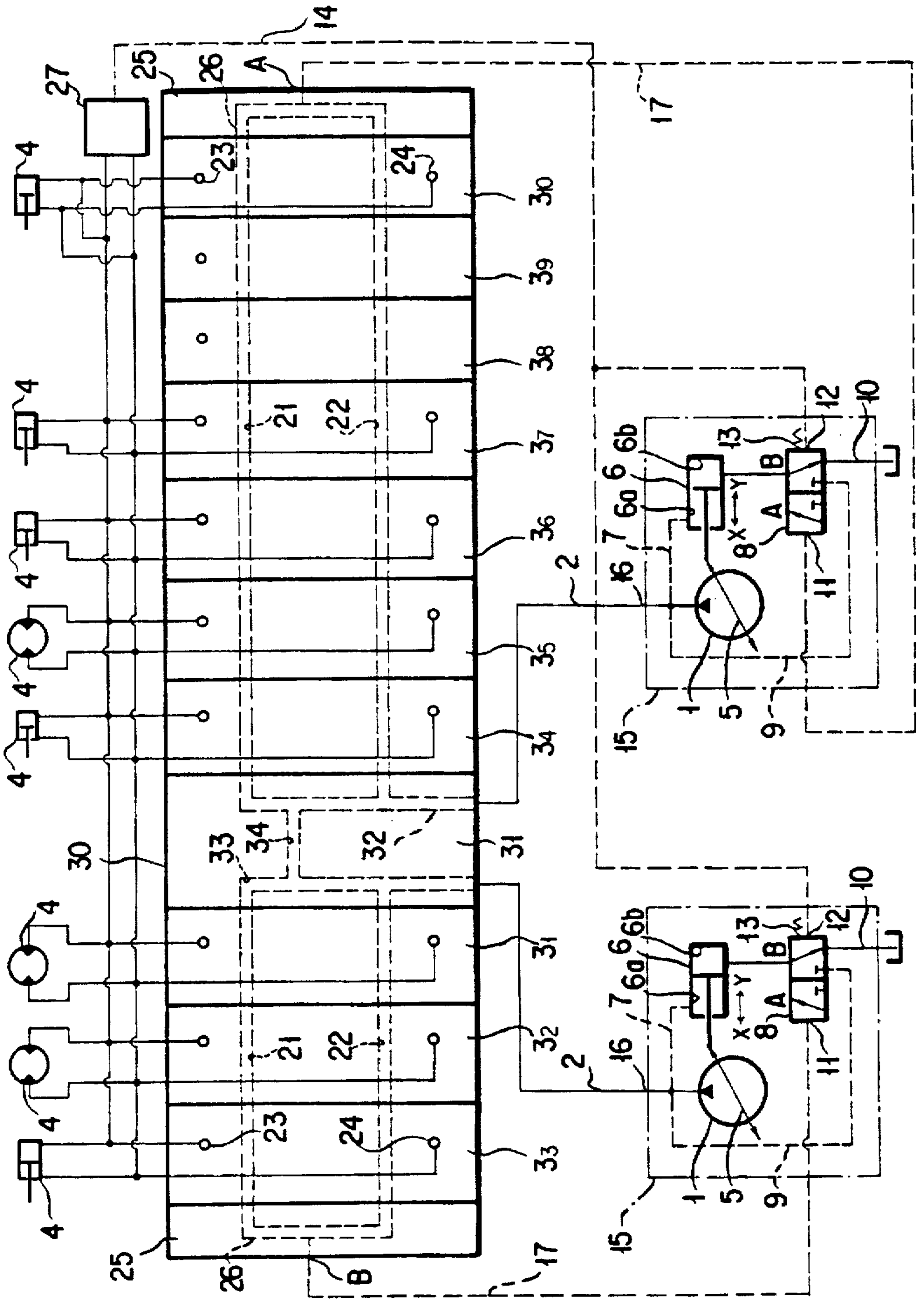
FIG. 4 is a hydraulic circuit diagram showing the third embodiment.

FIG. 4 shows the third embodiment.

In the shown embodiment, the discharge paths 2 of two variable hydraulic pumps 1 and 1 are connected to first and second inlet ports 32 and 33 of a valve body 31 of a confluence valve 30 having a confluence passage 34. At the left side of the confluence valve 30, a block which is formed by combining valve bodies 20 of first, second and third direction control valves $3_1$, $3_2$ and $3_3$, is coupled. On the other hand, at the right side of the confluence valve, a block which is formed by combining valve bodies 20 of the fourth to tenth direction control valves $3_4$ to $3_{10}$ is coupled. Also, to the fluid conduit 26 of the cover 25 coupled with the valve body 20 of the first direction control valve $3_1$, the pump discharge pressure detecting circuit 17 of one of the hydraulic pumps 1 is connected. To the fluid conduit 26 of the cover 25 coupled with the valve body 20 of the tenth direction control valve $3_{10}$, the pump discharge pressure detecting circuit 17 of the other hydraulic pump 1 is connected.

Since the shown embodiment is constructed as set forth above, in a circuit communicating the first and second actuator ports 23 and 24 of respective direction control valves 3 and respective actuators 4, maximum load pressure detecting circuit 27 is provided. The load pressure detecting circuit 14 is connected with the maximum load pressure detecting circuit 27 so that the maximum load pressure of the first to tenth direction control valves $3_1$ to $3_{10}$ is supplied to the load pressure detecting circuit 14.

Since the shown embodiment is constructed as set forth above, the discharged pressurized fluid of one variable hydraulic pump 1 and the discharged pressurized fluid of the other variable hydraulic pump 1 are combined in the confluence valve 30 and supplied to respective actuators 4 from respective direction control valves 3.

It should be noted that, in FIG. 4, the first direction control valve $3_1$ is a turning valve supplying the pressurized fluid of the turning hydraulic motor of a power shovel, similarly, the second direction control valve $3_2$ is a left traveling valve supplying the pressurized fluid to a left side traveling hydraulic motor, the third direction control valve $3_3$ is an arm valve supplying the pressurized fluid to an arm cylinder, the fourth, fifth and sixth direction control valves $3_4$, $3_5$ and $3_6$ are boom valve, right traveling valve and bucket valve supplying pressurized fluid to a boom cylinder, a right side traveling hydraulic motor and a bucket cylinder, respectively, the seventh direction control valve $3_7$ is an auxiliary boom and arm valve assisting supply of the pressurized fluid to the boom cylinder and the arm cylinder, the eighth, ninth and tenth direction control valves $3_8$, $3_9$ and $3_{10}$ are service valves for supplying the pressurized fluid to actuators to be added to normal power shovel of a crusher as attachment, for example, double holding boom cylinder, rotary arm and so forth. Respective actuators supplied the pressurized fluid by respective service valves are not required fine operation but requires large flow rate.

On the other hand, in FIG. 4, when the pressurized fluid is supplied from the left and right variable hydraulic pumps 1, 1 to the actuators 4 with the service valve constituted of the tenth direction control valve $3_{10}$ which is most distant from the confluence valve 30, a pressure loss corresponding to flow resistances of the pressurized fluid flowing through first or second pump paths 21, 22 of the fourth to ninth direction control valves 3a from the confluence valve 30, in terms of the inlet pressure of the third direction control valve $3_{10}$. Also, in FIG. 4, concerning the pressurized fluid supplied from the left side variable hydraulic pump 1, there is the pressure loss due to flow resistance when the pressurized fluid flows through the communication path 34 of the confluence valve 30.

At this time, the pressure of the pump discharge pressure detecting portion A controlling the displacement of the right side variable hydraulic pump 1 is substantially equal to the inlet pressure of the tenth direction control valve $3_{10}$ and thus is not affected by the flow resistance of the path. However, the pressure of the pump discharge pressure detecting portion B controlling displacement of the left side variable hydraulic pump 1 becomes higher than the inlet pressure of the tenth direction control valve $3_{10}$ in the extent of a sum of the pressure loss through the fourth to ninth direction control valves $10_4$ to $10_9$ and the pressure loss of the communication path 34 of the confluence valve 30. It should be appreciated that since the pressurized fluid does not flow through the first and second pump ports 21 and 22 of the first to third direction control valves $3_1$ to $3_3$, the pressure at the pump discharge pressure detecting portion B is equal to the pressure at the second inlet port 33. Accordingly, the pressure difference $\Delta P_{LS}$ between the first and second pressure receiving portions 11 and 12 of the displacement control valve 8 controlling displacement of the left side variable hydraulic pump becomes greater in the extent corresponding to the pressure loss set forth above, and the displacement of the left side variable hydraulic pump 1 is decreased in the corresponding amount. Therefore, it is possible that the flow rate of the pressurized fluid supplied to the actuator 4 from the service valve constituted of the tenth direction control valve $3_{10}$ is decreased and thus the demand of the service valve cannot be satisfied.

Figure 5:
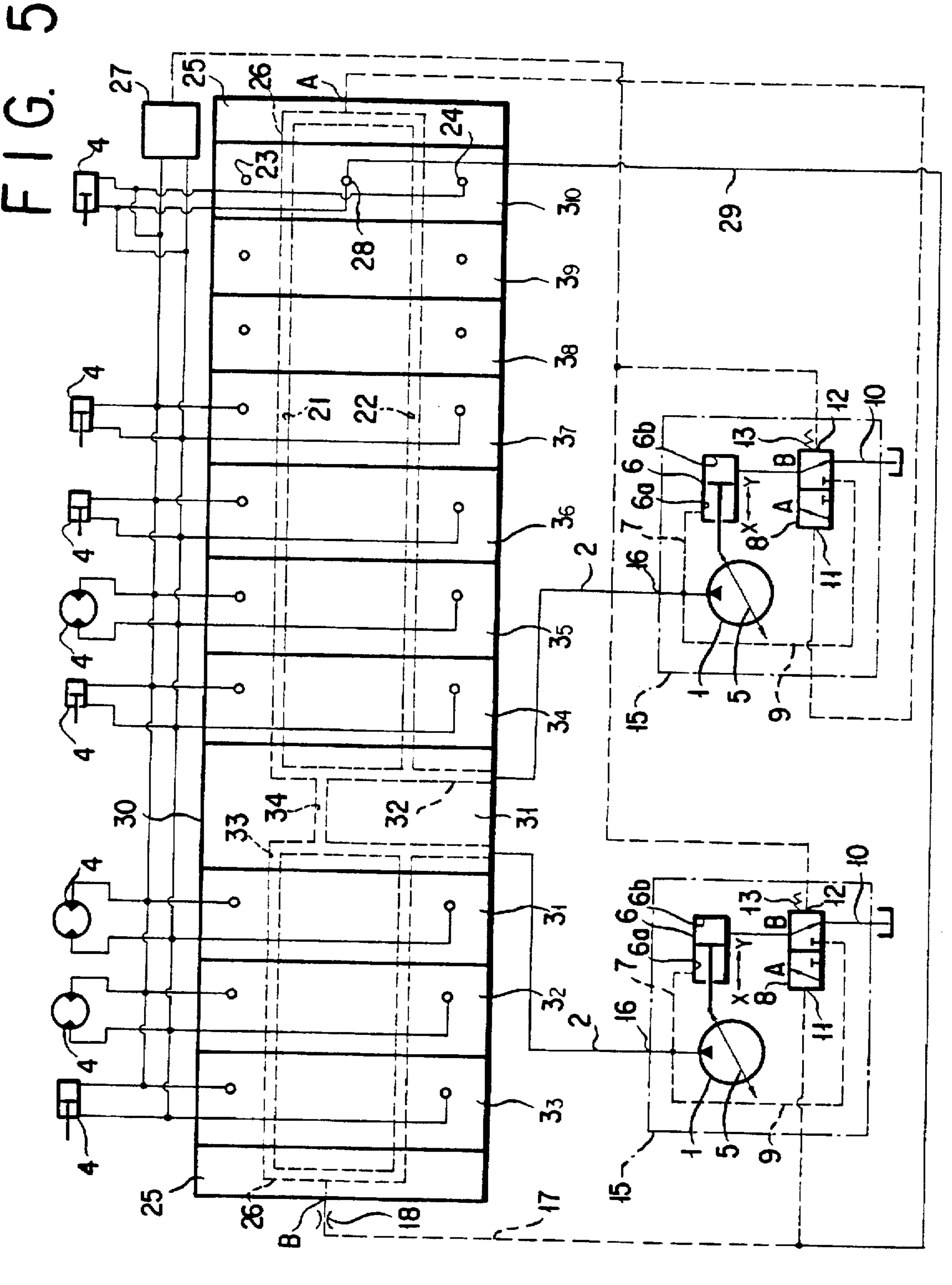
FIG. 5 is a hydraulic circuit diagram showing the fourth embodiment.

FIG. 5 shows the fourth embodiment solving the drawback in the third embodiment.

In the shown embodiment, an inlet pressure detecting port 28 is formed in the valve body 20 of the tenth direction control valve $3_{10}$. Only when the first pump port 21 is communicated with the first actuator port 23 or when the second pump port 22 is communicated with the second actuator port 24 by shifting the not shown spool, the first pump port 21 is communicated with the inlet pressure detecting port 28. The inlet pressure detecting port 28 is connected to the left side pump discharge pressure detecting circuit 17 through a circuit 29.

On the other hand, in the vicinity of the pump discharge pressure detecting portion B of the left side pump discharge pressure detecting circuit 17, the orifice 18 is provided so that the pressure of the fluid conduit 26 upon actuation of the tenth direction control valve $3_{10}$ does not affect for the circuit 29 or the first pressure receiving portion 11 of the displacement control valve 8.

Thus, the inlet pressure of the tenth direction control valve $3_{10}$ acts on the first pressure receiving portion 11 of the displacement control valve 8 of the left side variable hydraulic pressure pump 1 to prevent the displacement from being decreased. In conjunction therewith, it becomes possible to avoid lack of displacement of the left side variable hydraulic pump 1 caused by the sum of the flow resistance (pressure loss) in flowing through the pump port of a plurality of direction control valves and the flow resistance of the communication path of the confluence valve. Thus, the demand of the service valve constituted of the tenth direction control valve $3_{10}$ can be satisfied to permit supply of necessary flow rate of the pressurized fluid to the actuator 4. Namely, it becomes possible to supply the pressurized fluid in the flow rate corresponding to a controlling pressure difference to the actuator 4.

Figure 6:
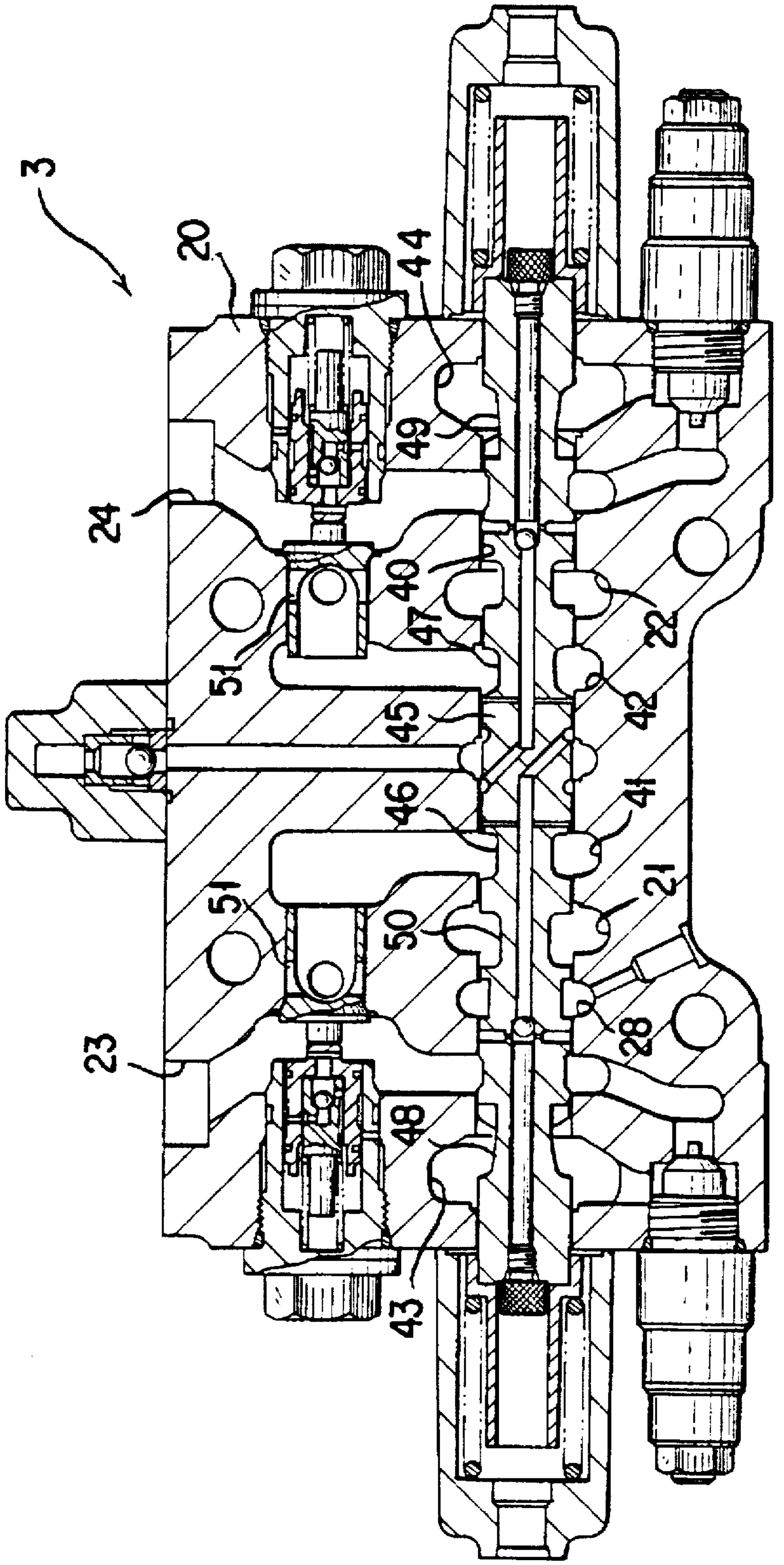
FIG. 6 is a detailed sectional view of a direction control value having inlet pressure detecting port, in the fourth embodiment.

FIG. 6 is a detailed sectional view of the fourth embodiment of the direction control valve 3 with the inlet pressure detecting port 28. In a spool bore 40 of the valve body 20 of the direction control valve 3, the first and second pump port 21, 22, the first and second actuator ports 23, 24, first and second outlet ports 41, 42, first and second tank ports 43, 44 and the inlet pressure detecting port 28 are formed. In a spool 45 disposed within the spool bore 40, first and second inlet side small diameter portions 46, 47, first and second outlet side small diameter portions 48, 49 and an inlet pressure detecting small diameter portion 50 are formed. Thus, by shifting the spool 45 from the shown neutral position toward left to communicate the first pump port 21 with the first outlet port 41 and communicate the second actuator port 24 with the second tank port 44, the pressurized fluid in the first outlet port 41 forces a check valve 51 to open to flow into the first actuator port 23. At the same time, by communication of the first pump port 21 with the inlet pressure detecting port 28 via the inlet pressure detecting small diameter portion 50, the inlet pressure is detected.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

We claim:

1. A displacement control system for a variable displacement type hydraulic pump for supplying a discharge pressurized fluid of said variable displacement type hydraulic pump to an actuator via a direction control valve and then controlling a displacement of said variable displacement type hydraulic pump for maintaining a pressure difference between a discharge pressure of said variable displacement type hydraulic pump and a load pressure at a portion between said direction control valve and said actuator, said system comprising a displacement control member of said variable displacement type hydraulic pump, a displacement controlling cylinder actuating said displacement control member and a displacement control valve supplying the pressurized fluid to said displacement control cylinder, wherein an inlet side pressure of said direction control valve is detected as said discharge pressure, said displacement control valve is actuated in a direction for smaller displacement in response to the pressure acting on a first pressure receiving portion of said valve and in a direction for greater displacement in response to pressure acting on a second pressure receiving portion of said valve, a pump discharge pressure detecting circuit connected to said first pressure receiving portion is connected to the inlet side of said direction control valve and a load pressure detecting circuit connected to said second pressure receiving portion is connected to the outlet side of said direction control valve, and an orifice is provided in said pump discharge pressure detecting circuit.

2. A displacement control system for a variable displacement type hydraulic pump for supplying a discharge pressurized fluid of said variable displacement type hydraulic pump to an actuator via a direction control valve and then controlling a displacement of said variable displacement type hydraulic pump for, maintaining a pressure difference between a discharge pressure of said variable displacement type hydraulic pump and a load pressure at a portion between said direction control valve and said actuator, said system comprising a displacement control member of said variable displacement type hydraulic pump, a displacement controlling cylinder actuating said displacement control member and a displacement control valve supplying the pressurized fluid to said displacement control cylinder, wherein an inlet side pressure of said direction control valve is detected as said discharge pressure, said displacement control valve is actuated in a direction for smaller displacement in response to the pressure acting on a first pressure receiving portion of said valve and in a direction for greater displacement in response to pressure acting on a second pressure receiving portion of said valve, a pump discharge pressure detecting circuit connected to said first pressure receiving portion is connected to the inlet side of said direction control valve and a load pressure detecting circuit connected to said second pressure receiving portion is connected to the outlet side of said direction control valve, and said direction control valve includes a valve body, a spool bore formed in said valve body and having a pump port and an actuator port, and a spool disposed within said spool bore and establishing and blocking communication between said pump port and said actuator port, valve bodies of a plurality of said direction control valves are combined with mutually communication respective pump pods, said discharge path of said variable hydraulic pump is connected to the pump port of some of the valve bodies of said plurality of direction control valves, and said pump discharge pressure detecting circuit is connected to the pump port of another valve body of said plurality of direction control valves.

3. A displacement control system for a variable displacement type hydraulic pump as set forth in claim 2, wherein a cover having a fluid conduit communicated with said pump port is coupled with said another valve body, and said pump discharge pressure detecting circuit is connected to said fluid conduit.

4. A displacement control system for a variable displacement type hydraulic pump as set forth in claim 2 or 3, wherein a maximum load pressure detecting circuit is provided in a circuit communicating said actuator port and said actuator for supplying the maximum load pressure detected by said maximum load pressure detecting circuit to said load pressure detecting circuit.

5. A displacement control system for a variable displacement type hydraulic pump as set forth in any one of claims 2 or 3, wherein an orifice is provided in said pump discharge pressure detecting circuit.

6. A displacement control system for a variable displacement type hydraulic pump as set forth in claim 2, which further includes a confluence valve having a valve body and two inlet ports formed in said valve body and communicated with each other, two blocks respectively formed by combining the valve blocks of said plurality of direction control valves are connected at both sides of said valve body of said confluence valve with communicating respective pump ports of said two blocks and said two inlet ports, discharge paths of respective variable displacement type hydraulic pumps connected to respective of said two blocks are connected to said two inlet ports respectively, and pump discharging pressure detecting circuits of respective displacement control system connected to respective of said two blocks are connected to the pump ports of said two blocks respectively.

7. A displacement control system for a variable displacement type hydraulic pump as set forth in claim 6, wherein an inlet pressure detecting port is formed in the valve body of said direction control valve in one of said block, located remote from said confluence valve, which inlet pressure detecting port communicates with said pump port only when said pump port is communicated with said actuator port, said inlet pressure detecting port is connected to said pump discharge pressure detecting circuit of said displacement control system connected to the other block, and an orifice is provided in said pump discharge pressure detecting circuit.

8. A displacement control system for a variable displacement type hydraulic pump as set forth in claim 6 or 7, a cover having the fluid conduits communicated with said pump ports is coupled with the valve body in each block, located at the opposite side of said confluence valve, and each of said pump discharge pressure detecting circuits is connected to each fluid conduit.

9. A displacement control system for a variable displacement type hydraulic pump as set forth in any one of claims 6 or 7, wherein a maximum load pressure detecting circuit is provided in a circuit communicating said actuator port and said actuator for supplying the maximum load pressure detected by said maximum load pressure detecting circuit to said load pressure detecting circuit.

* * * * *